United States Patent
Kim et al.

(10) Patent No.: US 8,543,151 B2
(45) Date of Patent: *Sep. 24, 2013

(54) METHOD FOR GENERATING DOWNLINK FRAME, AND METHOD FOR SEARCHING CELL

(75) Inventors: Il Gyu Kim, Seoul (KR); Young Jo Ko, Daejeon (KR); Hyeong Geun Park, Daejeon (KR); Kap Seok Chang, Daejeon (KR); Hyo Seok Yi, Daejeon (KR); Young-Hoon Kim, Daejeon (KR); Seung Chan Bang, Daejeon (KR); Kyoung Joon Lee, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,076

(22) Filed: Aug. 10, 2012

(65) Prior Publication Data

US 2012/0314870 A1    Dec. 13, 2012

Related U.S. Application Data

(63) Continuation of application No. 12/666,925, filed on Dec. 28, 2009, now Pat. No. 8,249,632.

(30) Foreign Application Priority Data

Jul. 19, 2007    (KR) .................. 10-2007-0072454
Jun. 16, 2008    (KR) .................. 10-2008-0056236

(51) Int. Cl.
    *H04Q 7/20*    (2006.01)

(52) U.S. Cl.
    USPC ........... 455/502; 455/500; 455/517; 455/507; 455/509; 455/515; 370/350; 370/509; 370/503; 370/512

(58) Field of Classification Search
    USPC ............ 455/502, 500, 517, 507, 509, 515, 455/434, 512, 426.1, 426.2, 422.1, 403, 511; 370/350, 310, 345, 509, 503, 506, 510, 512
    See application file for complete search history.

(56) References Cited

U.S. PATENT DOCUMENTS

2008/0181194 A1    7/2008    Lindoff et al.
2008/0212462 A1    9/2008    Ahn et al.
2008/0291945 A1    11/2008    Luo

FOREIGN PATENT DOCUMENTS

KR    10-2007-0025944 A    3/2007
WO    2004/064295 A2    7/2004
WO    2005/101694 A2    10/2005

OTHER PUBLICATIONS

Etri, S-SCH Scrambling Methods, 3GPP TSG RAN WG1 Meeting #50bis, Oct. 8-12, 2007, R1-074053, Shanghia, China.

*Primary Examiner* — Keith Ferguson
(74) *Attorney, Agent, or Firm* — Jefferson IP Law, LLP

(57) ABSTRACT

The present invention relates to a method of generating a downlink frame. The method of generating the downlink frame includes generating a first sequence and a second sequence for identifying cell groups; generating a first scrambling sequence and a second scrambling sequence that are one-to-two mapped to the sequence number of the primary synchronization signal; scrambling the first sequence with the first scrambling sequence and scrambling the second sequence with the second scrambling sequence; and generating a secondary synchronization signal including the scrambled first sequence and second sequence and mapping the secondary synchronization signal to a frequency domain.

20 Claims, 12 Drawing Sheets

First secondary synchronization signal     Second secondary synchronization signal Secondary synchronization signal of sub-frame 0

Secondary synchronization signal of sub-frame 5

Secondary synchronization signal of sub-frame 0

Secondary synchronization signal of sub-frame 5

Secondary synchronization signal of sub-frame 0

Secondary synchronization signal of sub-frame 5

Secondary synchronization signal of sub-frame 0

Secondary synchronization signal of sub-frame 5

Secondary synchronization signal of sub-frame 0

Secondary synchronization signal of sub-frame 5

METHOD FOR GENERATING DOWNLINK FRAME, AND METHOD FOR SEARCHING CELL

CROSS-REFERENCE TO RELATED APPLICATIONS

This application is a continuation of U.S. application Ser. No. 12/666,925, which was the National Stage of International Application No. PCT/KR2008/003605, filed Jun. 24, 2008, which claimed the benefit under 35 U.S.C. §365 of a Korean patent application filed on Jul. 19, 2007 in the Korean Intellectual Property Office and assigned Serial No. 10-2007-0072454, and of a Korean patent application filed on Jun. 16, 2008 in the Korean Intellectual Property Office and assigned Serial No. 10-2008-0056236, the entire disclosure of each of which is hereby incorporated by reference.

TECHNICAL FIELD

The present invention relates to a method of generating a downlink frame and a method of searching a cell, and more particularly, to a method of generating a downlink frame in a cellular system based on an orthogonal frequency division multiplexing (OFDM) scheme and a method of searching a cell by using the downlink frame.

This work was supported by the IT R&D program of MIC/IITA [2005-S-404-13, Development of Radio Wireless Transmission Technology for 3G Evolution].

BACKGROUND ART

In $3^{rd}$ Generation Long Term Evolution (3G LTE), a total of 504 cell identifiers are defined, and the 504 cell identifiers are divided into 168 cell identifier groups. Therefore, three cell identifiers exist in each cell identifier group. A downlink frame for 3G LTE includes two synchronization channels, that is, a primary synchronization channel and a secondary synchronization channel. The primary synchronization channel provides 5 msec-timing and information on three cell identifiers in the cell identifier group to a terminal. Accordingly, three primary synchronization channel sequences are used in the LTE system, and the primary synchronization channel sequences transmitted in a cell are equal to each other at each location of primary synchronization channel symbols. Since the secondary synchronization channel provides information on the cell identifier group and 10 msec-frame timing to the terminal, the secondary synchronization channel sequences transmitted from the location of two secondary synchronization channel symbols in the 10 msec-frame are different from each other. Therefore, the number of secondary synchronization channel sequences becomes 336 (=168*2).

FIG. 1 is a view illustrating a method of generating a secondary synchronization channel symbol according to the conventional art. As shown in FIG. 1, the secondary synchronization channel symbol according to the conventional art is an OFDM signal in which two short binary sequences are combined to each other in a frequency domain, thereby providing cell group information and frame boundary information to the terminal. The length of the binary sequences is 31, and the number of binary sequences is also 31. Ultimately, the number of sequences (62 in length) of the secondary synchronization symbol that can be generated as a pair of binary sequences is 961 in total, and only 336 sequences of these are used.

In the 3G LTE technique, four short binary sequences are used during a 10 msec-frame interval. At this time, the four short binary sequences may be different from one another or may be equal to one another, and four short binary sequences are provided to every cell by the cell group identifier. It can use at least one same sequence or two same sequences among four short binary sequences between adjacent cells, particularly between adjacent cells when 10 msec synchronization of two cells match with each other. In this case, interference between adjacent cells largely operates during a cell search process in the terminal, and performance can be significantly deteriorated.

DETAILED DESCRIPTION

Technical Problem

The present invention has been made in an effort to provide a method of generating a downlink frame that can reduce interference between adjacent cells and a method of efficiently searching a cell by receiving the downlink frame.

Technical Solution

An exemplary embodiment of the present invention provides a method of generating a downlink frame. The method includes: generating a first sequence and a second sequence for identifying cell groups; generating a first scrambling sequence and a second scrambling sequence that are one-to-two mapped to the sequence number of the primary synchronization signal; scrambling the first sequence with the first scrambling sequence and scrambling the second sequence with the second scrambling sequence; and generating a secondary synchronization signal including the scrambled first sequence and second sequence and mapping the secondary synchronization signal to a frequency domain.

Another embodiment of the present invention provides an apparatus for generating a downlink frame. The apparatus includes: a sequence generator that generates a first sequence and a second sequence for identifying cell groups and generates a first scrambling sequence and a second scrambling sequence that are one-to-two mapped to the sequence number of the primary synchronization signal; and a synchronization signal generator that, after scrambling the first sequence with the first scrambling sequence and scrambling the second sequence with the second scrambling sequence, generates a secondary synchronization signal including the scrambled first sequence and second sequence.

Yet another embodiment of the present invention provides a method of searching a cell. The method includes: receiving a downlink frame including a primary synchronization signal and secondary synchronization signal; and determining a cell group to which a terminal belongs, by using the secondary synchronization signal. In this case, the secondary synchronization signal is generated by alternately allocating a first sequence scrambled with a first scrambling sequence and a second sequence scrambled with a second scrambling sequence to a plurality of sub-carriers, and the first scrambling sequence and the second scrambling sequence are two-to-one mapped to the sequence of the primary synchronization signal.

Yet another embodiment of the present invention provides an apparatus for searching a cell in a terminal. The apparatus includes: a first-stage searcher that acquires a sequence number allocated to a primary synchronization signal; and a second-stage searcher that identifies a cell group to which the terminal belongs, from the secondary synchronization signal. In this case, the secondary synchronization signal is generated by alternately allocating a first sequence scrambled with a first scrambling sequence and a second sequence scrambled with a second scrambling sequence to a plurality of sub-carriers, and the first scrambling sequence and the second scrambling sequence are two-to-one mapped to the sequence of the primary synchronization signal.

Yet another embodiment of the present invention provides a recording medium for recording a frame generating program. The frame generating program includes: a function for generating a first sequence and a second sequence for identifying cell groups; a function for generating a first scrambling sequence and a second scrambling sequence that are one-to-two mapped to the sequence number of the primary synchronization signal; a function for scrambling the first sequence with the first scrambling sequence and scrambling the second sequence with the second scrambling sequence; and a function for generating a secondary synchronization signal including the scrambled first sequence and second sequence and for mapping the secondary synchronization signal to a frequency domain.

Advantageous Effects

According to the above-described present invention, interference between sectors is reduced by scrambling two sequences to be allocated to a secondary synchronization channel with different scrambling code, thereby improving cell searching performance.

BEST MODE

Figure 1:
FIG. 1 is a view illustrating a method of generating a secondary synchronization channel symbol according to the conventional art.
Figure 1:

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification, unless explicitly described to the contrary, the word "comprise" and variations such as "comprises" or "comprising" will be understood to imply the inclusion of stated elements but not the exclusion of any other elements. In addition, the terms "-or", "-er", or the like described in the specification represent a unit for processing at least one function and operation, which can be implemented by hardware components or software components and combinations thereof.

First, a configuration of a downlink frame and a synchronization channel in an OFDM system according to an exemplary embodiment of the present invention will be described with reference to FIG. 2.

Figure 2:
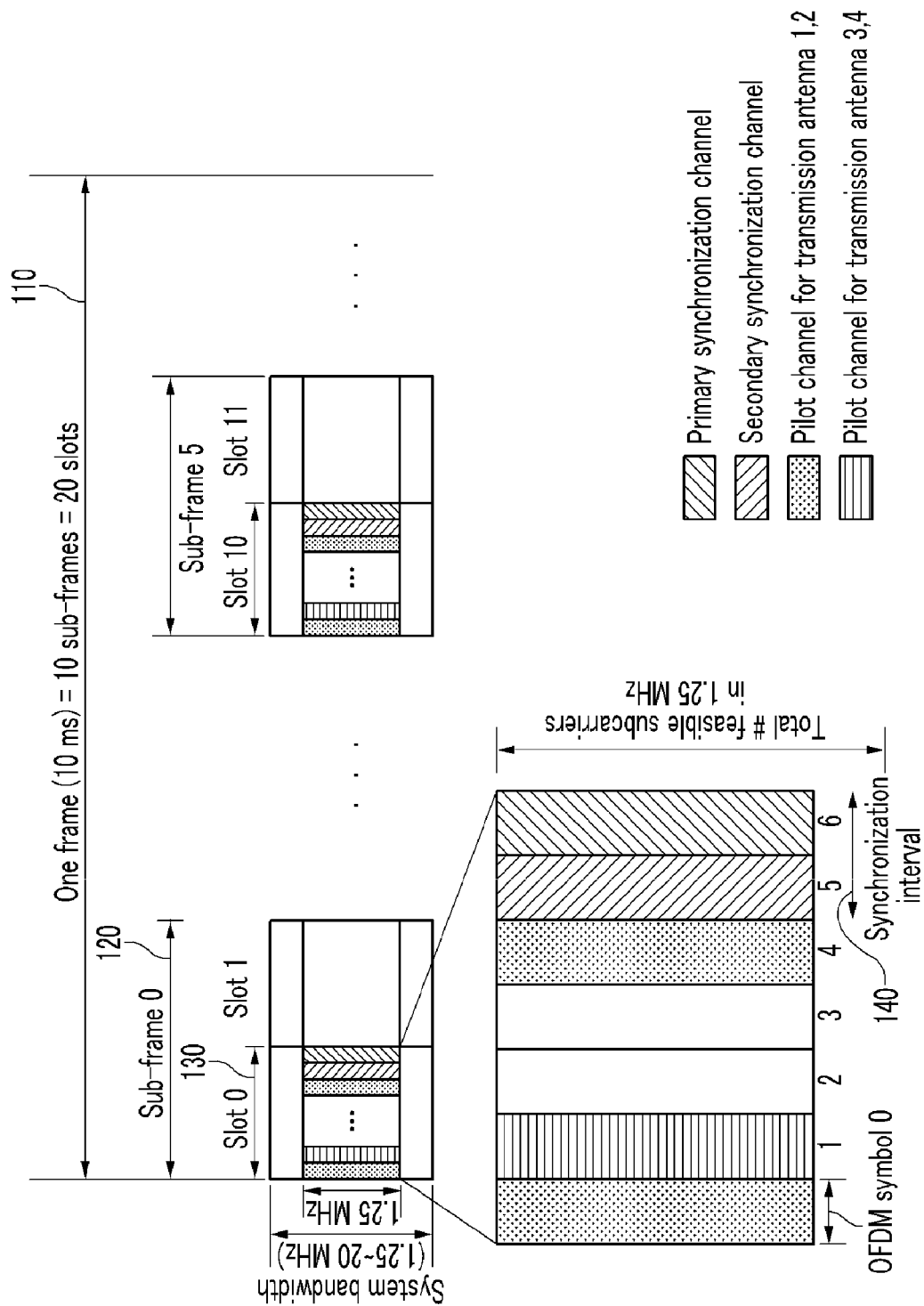
FIG. 2 is a view illustrating a downlink frame of an OFDM system according to an exemplary embodiment of the present invention.

FIG. 2 is a view illustrating a downlink frame of an OFDM system according to an exemplary embodiment of the present invention. In FIG. 2, the horizontal axis represents a time axis, and the vertical axis represents a frequency axis or a sub-carrier axis.

As shown in FIG. 2, according to the exemplary embodiment of the present invention, one downlink frame 110 has a time interval of 10 msec and includes ten sub-frames 120. Moreover, one sub-frame 120 has a time interval of 1 msec and includes two slots 130, and one slot 130 includes seven OFDM symbols.

As shown in FIG. 2, according to the exemplary embodiment of the present invention, one downlink frame 110 has two synchronization intervals 140 in total including a synchronization interval in slot No. 0 and slot No. 10, respectively. However, it is not necessarily limited thereto. That is, one downlink frame 110 may include the synchronization interval in any slot, and may include one synchronization interval or three synchronization intervals or more. Furthermore, each slot includes a pilot interval.

The synchronization interval according to the exemplary embodiment of the present invention includes a primary synchronization channel symbol and a secondary synchronization channel symbol that are disposed so as to be adjacent to each other in view of time. As shown in FIG. 2, the primary synchronization channel symbol is located at the end of the slot and the secondary synchronization channel symbol is located right ahead of the primary synchronization channel.

In an mobile communication system according to the exemplary embodiment of the present invention, a plurality of cells are grouped into a plurality of cell groups, and each of the cell groups includes at least two cells.

The primary synchronization channel includes information for identifying symbol synchronization and frequency synchronization and cell identifier information for identifying the cells in the cell groups, and the secondary synchronization channel includes information for identifying the cell group information and the frame synchronization.

Figure 3:
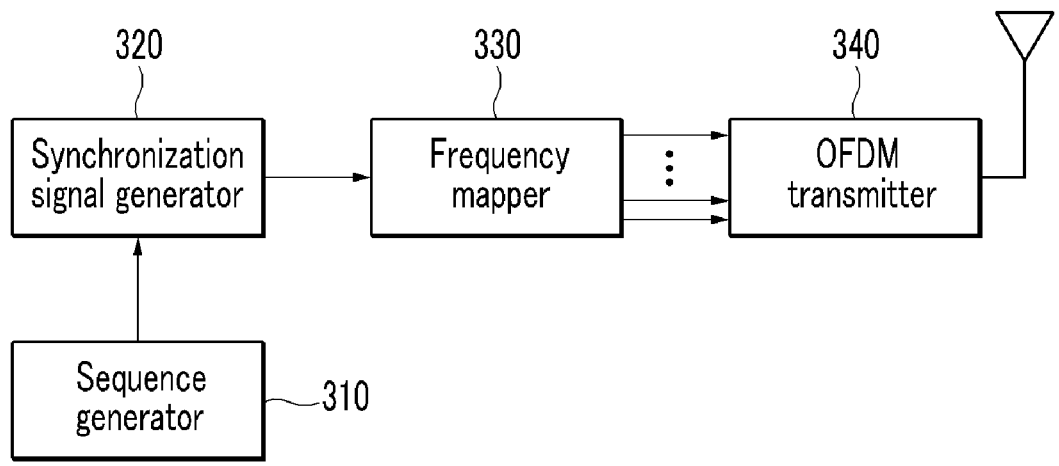
FIG. 3 is a block diagram of a downlink frame generating apparatus according to an exemplary embodiment of the present invention.

A downlink frame generating apparatus according to the exemplary embodiment of the present invention will now be described with reference to FIG. 3. FIG. 3 is a block diagram of the downlink frame generating apparatus according to the exemplary embodiment of the present invention.

As shown in FIG. 3, the downlink frame generating apparatus according to the exemplary embodiment of the present invention includes a sequence generator 310, a synchronization signal generator 320, a frequency mapper 330, and an OFDM transmitter 340.

The sequence generator 310 generates a sequence for identifying cell groups and frame boundaries and a scrambling sequence, and transmits them to the synchronization signal generator 320. The scrambling sequence is for scrambling the sequence.

The synchronization signal generator 320 generates a secondary synchronization signal by using the sequence and the scrambling sequence.

The frequency mapper 330 maps transmission data to the time and frequency domains by using the synchronization signal generated in the synchronization signal generator 320, and frame control information and transmission traffic data transmitted from the outside, thereby generating the downlink frame.

The OFDM transmitter 340 receives the downlink frame from the frequency mapper 330 and transmits the downlink frame through a transmission antenna.

Figure 4:
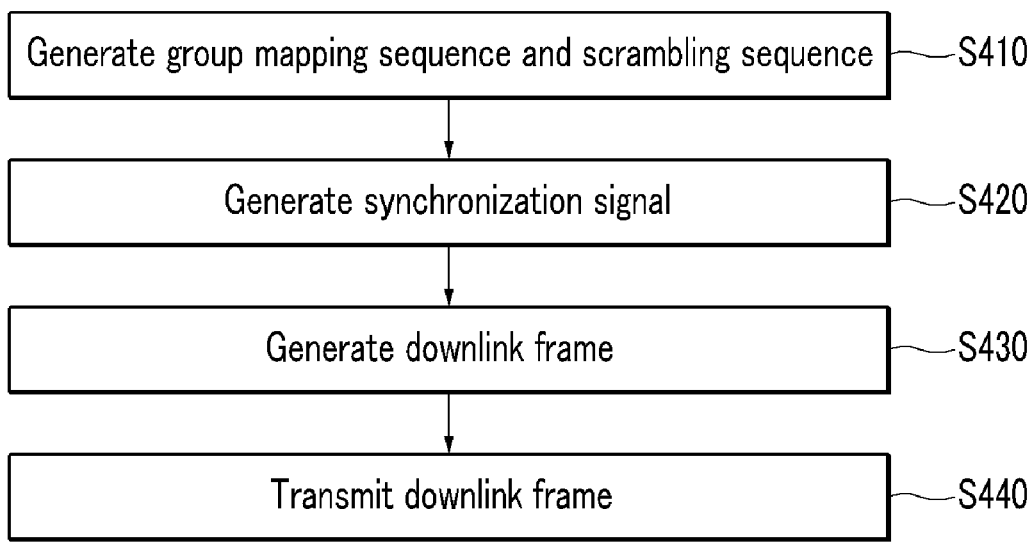
FIG. 4 is a flowchart of a downlink frame generating method according to an exemplary embodiment of the present invention.

Referring to FIG. 4 through FIG. 12, a downlink frame generating method according to the exemplary embodiment of the present invention will now be described. FIG. 4 is a flowchart of the downlink frame generating method according to the exemplary embodiment of the present invention.

As shown in FIG. 4, the sequence generator 310 generates a plurality of sequences and a plurality of scrambling sequences and transmits them to the synchronization signal generator 320 (S410).

First, a method of generating the sequences will be described with reference to FIG. 5. The sequence is a cyclic shift of an m-sequence that has a length of 31. A primitive polynomial can make the m-sequence that has a length of 31, and six primitive polynomials are in existence, as indicated in Equation 1.

$$P0: x^5+x^2+1$$
$$P1: x^5+x^3+1$$
$$P2: x^5+x^3+x^2+x+1$$
$$P3: x^5+x^4+x^2+x+1$$
$$P4: x^5+x^4+x^3+x+1$$
$$P5: x^5+x^4+x^3+x^2+1 \quad \text{(Equation 1)}$$

Figure 5:
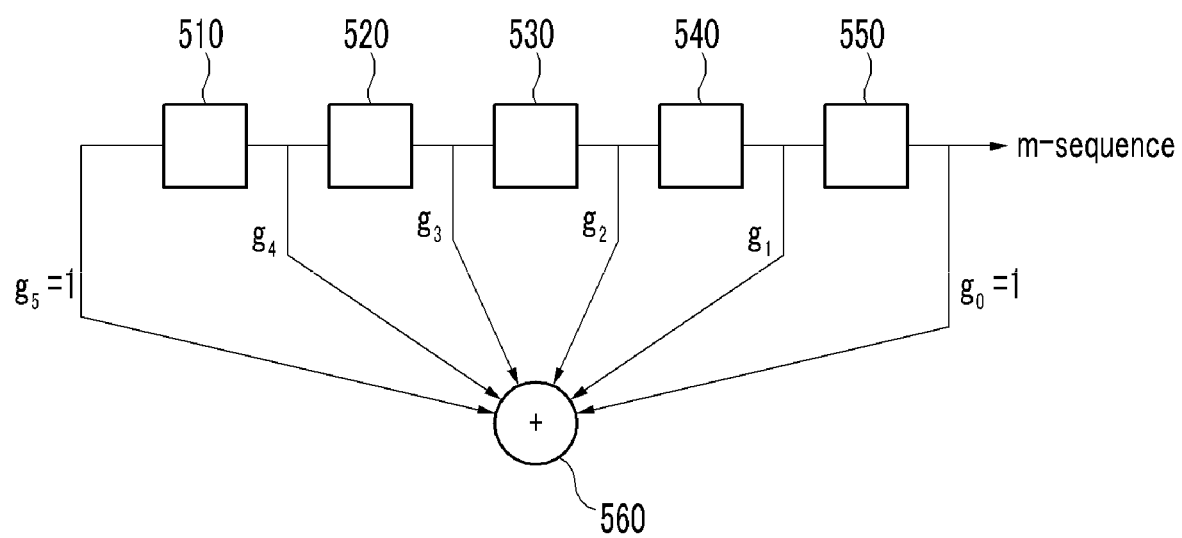
FIG. 5 is a view illustrating an m-sequence generator.

FIG. 5 is a view illustrating an m-sequence generator. As shown in FIG. 5, the m-sequence generator includes a plurality of delay operators 510, 520, 530, 540, and 550, and an exclusive OR operator 560. In FIG. 5, $g_0, g_1, g_2, g_3, g_4$, and $g_5$ represent coefficients in the primitive polynomial of Equation 1. The coefficients $g_0$ and $g_5$ always have a value of 1, and the remaining coefficients $g_1, g_2, g_3$, and $g_4$ have a value of 0 or 1 according to the primitive polynomial. For example, when the primitive polynomial is $x^5+x^2+1$, the coefficients $g_1, g_3$, and $g_4$ have a value of 0, and the coefficient $g_2$ has a value of 1. When the value of the coefficient is 1, the output of a corresponding delay operator is connected to the output of the exclusive OR operator 560. Meanwhile, when the value of the coefficient is 0, the output of the corresponding delay operator is not connected to the output of the exclusive OR operator 560.

The downlink frame generating method according to the exemplary embodiment of the present invention uses the cyclic shift sequence of the m-sequence, which is defined by the primitive polynomial of $x^5+x^2+1$, as a sequence. That is, assuming that $c^0=\{c^0 0, c^0 1, c^0 2, \ldots, c^0 30\}$ is referred to as the m-sequence generated by counting any value in the sequence generator having the primitive polygonal of $x^5+x^2+1$, 31 m-sequences may be generated as indicated in Equation 2.

$$c^0 = \{c^00, c^01, c^02, \ldots, c^030\} \quad \text{(Equation 2)}$$
$$c^1 = \{c^10, c^11, c^12, \ldots, c^130\}$$
$$= \{c^01, c^02, c^03, \ldots, c^00\}$$
$$c^2 = \{c^20, c^21, c^22, \ldots, c^230\}$$
$$= \{c^02, c^03, c^04, \ldots, c^01\}$$
$$\ldots$$
$$c^{30} = \{c^{30}0, c^{30}1, c^{30}2, \ldots, c^{30}30\}$$
$$= \{c^030, c^00, c^01, \ldots, c^029\}$$

In Equation 2, the value of each element of the m-sequence is 1 or −1.

Figure 6:
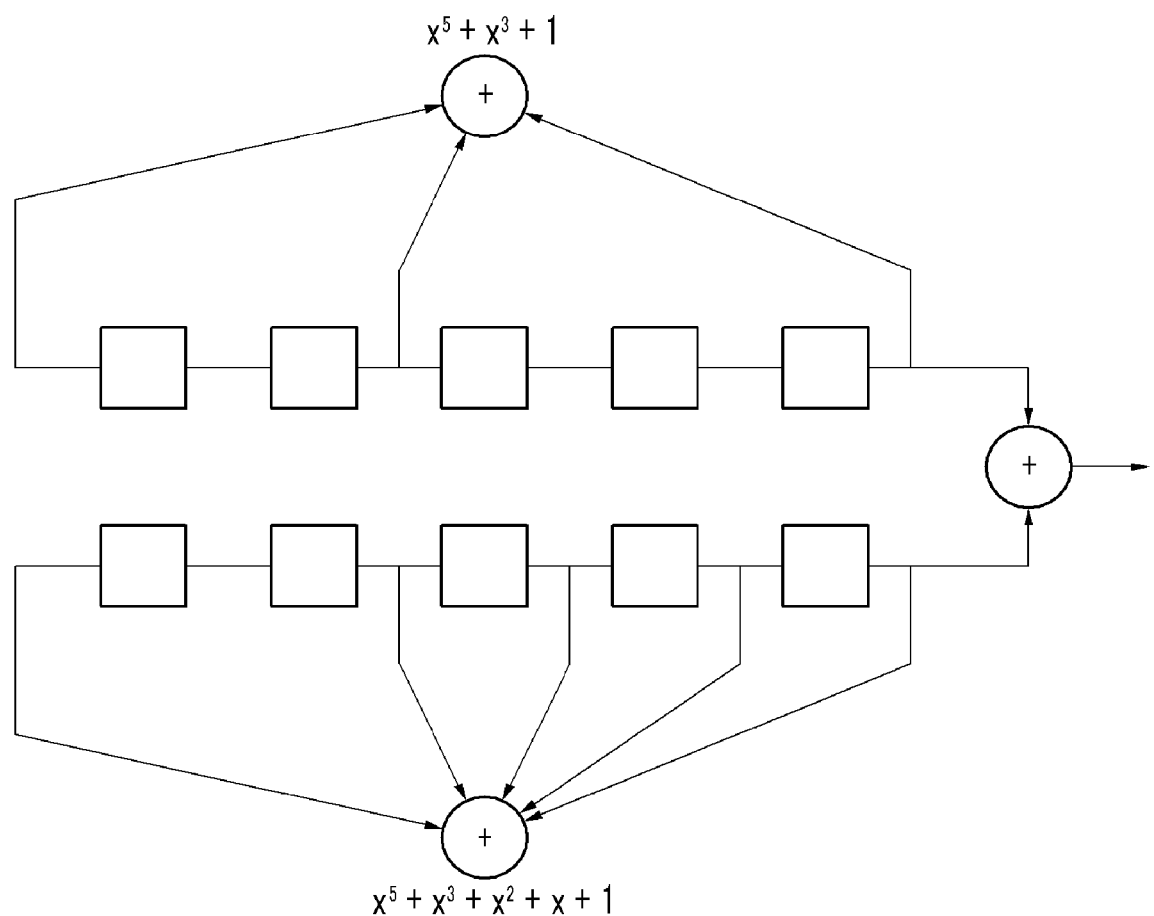
FIG. 6 is a view illustrating a Gold sequence generator.
Figure 7:
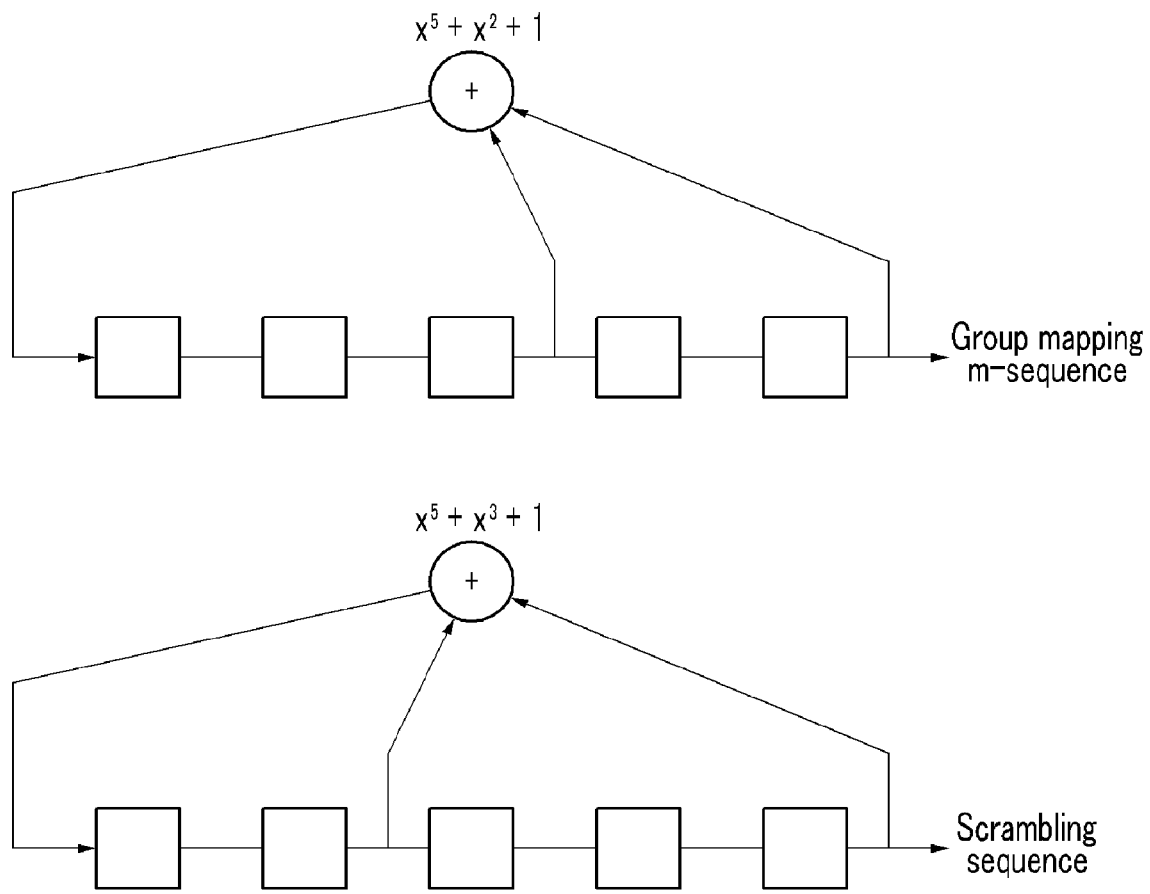
FIG. 7 is a view illustrating a sequence generator and a scrambling sequence generator.

Next, a method of generating a scrambling sequence will be described with reference to FIG. 6 and FIG. 7.

A Gold sequence having a good correlation characteristic may be used as the scrambling sequence. The Gold sequence is formed by combining two m sequences having the same length.

Preferred pairs refer to pairs of m-sequences that are capable of generating the Gold sequence among the m-sequences defined by the six primitive polynomials in Equation 1. That is, the preferred pairs are capable of generating the Gold sequence that has a length of 31, and the number of preferred pairs is 12, for example [P0 P2], [P0 P3], [P0 P4], [P0 P5], [P1 P2], [P1 P3], [P1 P4], [P1 P5], [P2 P3], [P2 P4], [P3 P5], and [P4 P5]. FIG. 6 is a view illustrating a Gold sequence generator. The Gold sequence generator shown in FIG. 6 generates the Gold sequence by using the preferred pair [P1 P2].

The Gold sequence may be generated by using one of the remaining preferred pairs except the preferred pair including the polynomial, which is used for generating the sequence, among the 12 preferred pairs. In the downlink frame generating method according to the exemplary embodiment of the present invention, since the polynomial $x^5+x^2+1$ is used as a polynomial of the sequence, the Gold sequence is generated by one of the preferred pairs [P1 P2], [P1 P3], [P1 P4], [P1 P5], [P2 P3], [P2 P4], [P3 P5], and [P4 P5]. The number of Gold sequences generated by selecting one of 8 preferred pairs is 33, which is two more than the sequence length. In 33 Gold sequences generated from the selected preferred pair, any sequence may be used as the scrambling sequence.

When one of the preferred pairs including the polynomial used for generating the sequence, that is, [P0 P2], [P0 P3], [P0 P4], and [P0 P5], is selected as a preferred pair for generating the Gold sequence, the remaining Gold sequences, which exclude the sequence from (N+2) Gold sequences (where N is 31 as a length of the Gold sequence) to be generated, should be used as a scrambling sequence. That is, 33 Gold sequences are generated by one of the preferred pairs [P0 P2], [P0 P3],

[P0 P4], and [P0 P5] including the polynomial used for generating the sequence, and 33 Gold sequences include the sequence. Accordingly, it should use the remaining Gold sequences except the sequence as a scrambling sequence.

With respect to the scrambling sequence, the m-sequence that is the same length as the sequence but is different from the sequence in the primitive polynomial and the cyclic shift sequence of the m-sequence may be used. That is, as the scrambling sequence of the present invention, the m-sequence that is generated by using one of other polynomials except the polynomial $x^5+x^2+1$ in the polynomials expressed by Equation 1 and the cyclic shift sequence of the m-sequence is used. FIG. 7 is a view illustrating a sequence generator and a scrambling sequence generator. As shown in FIG. 7, when the m-sequence and the cyclic shift sequence of the m-sequence are used as the scrambling sequence, the scrambling sequence may be generated by varying only a connection part of the sequence generator having the same structure as the sequence. Accordingly, this has the merit of reducing complexity of a terminal.

The synchronization signal generator 320 generates the secondary synchronization signal by using the plurality of sequences and the plurality of scrambling sequences received from the sequence generator 310 (S420). The exemplary embodiment of the present invention describes the case where one frame includes two secondary synchronization channels, but is not limited thereto.

Five kinds of secondary synchronization signal generating methods according to the exemplary embodiment of the present invention will be described with reference to FIG. 8 through FIG. 12.

Figure 8:
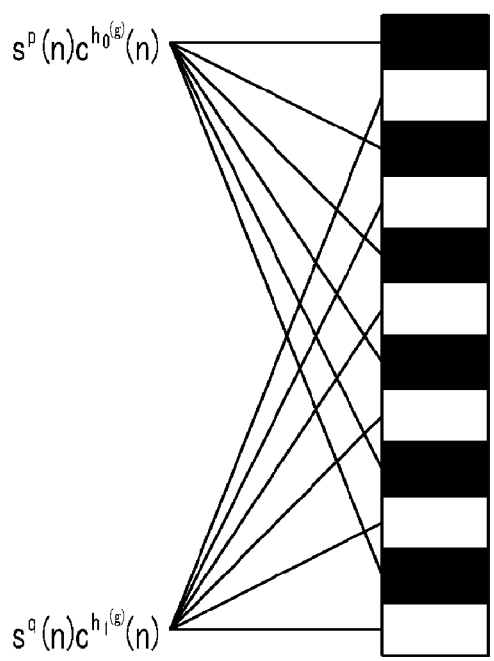
FIG. 8 is a view illustrating the first secondary synchronization signal generating method according to an exemplary embodiment of the present invention.
Figure 8:
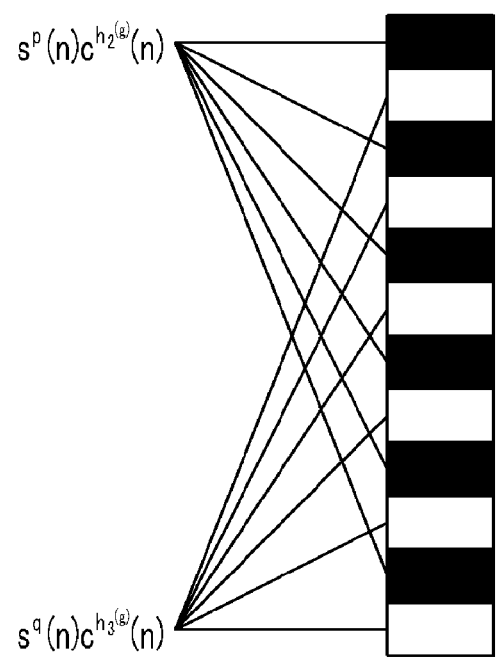

FIG. 8 is a view illustrating a first secondary synchronization signal generating method according to the exemplary embodiment of the present invention. As shown in FIG. 8, according to the first secondary synchronization signal generating method of the exemplary embodiment of the present invention, a first sequence $c^{h_0^{(g)}}(n)$ is scrambled with a first scrambling sequence $s^p$, and the scrambled first sequence is allocated to even-numbered sub-carriers of the secondary synchronization channel in the sub-frame No. 0. Furthermore, in the first secondary synchronization signal generating method, a second sequence $c^{h_1^{(g)}}(n)$ is scrambled with a second scrambling sequence $s^q$ that is different from the first scrambling sequence $s^p$, and the scrambled second sequence is allocated to odd-numbered sub-carriers of the secondary synchronization channel in the sub-frame No. 0. In addition, according to the first secondary synchronization signal generating method of the exemplary embodiment of the present invention, a third sequence $c^{h_2^{(g)}}(n)$ is scrambled with a third scrambling sequence, and the scrambled third sequence is allocated to even-numbered sub-carriers of the secondary synchronization channel in the sub-frame No. 5. Furthermore, in the first secondary synchronization signal generating method, a fourth sequence $c^{h_3^{(g)}}(n)$ is scrambled with a fourth scrambling sequence that is different from the third scrambling sequence, and the scrambled fourth sequence is allocated to odd-numbered sub-carriers of the secondary synchronization channel in the sub-frame No. 5.

That is, according to the first secondary synchronization signal generating method, each element of the first sequence $c^{h_0^{(g)}}(n)$ is multiplied by a corresponding element of the first scrambling sequence $s^p$, and the product is allocated to even-numbered sub-carriers of the secondary synchronization channel in the sub-frame No. 0. Moreover, each element of the second sequence $c^{h_1^{(g)}}(n)$ is multiplied by a corresponding element of the second scrambling sequence $s^q$, and the product is allocated to odd-numbered sub-carriers of the secondary synchronization channel in the sub-frame No. 0. In addition, according to the first secondary synchronization signal generating method, each element of the third sequence $c^{h_2^{(g)}}(n)$ is multiplied by a corresponding element of the third scrambling sequence, and the product is allocated to even-numbered sub-carriers of the secondary synchronization channel in the sub-frame No. 5. Moreover, each element of the fourth sequence $c^{h_3^{(g)}}(n)$ is multiplied by a corresponding element of the fourth scrambling sequence, and the product is allocated to odd-numbered sub-carriers of the secondary synchronization channel in the sub-frame No. 5.

The first scrambling sequence is expressed as $s^p=\{s^p 0, s^p 1, s^p 2, \ldots, s^p 30\}$, and the second scrambling sequence is expressed as $s^q=\{s^q 0, s^q 1, s^q 2, \ldots, s^q 30\}$. Here, p and q represent a scrambling sequence number, respectively.

The same scrambling sequence is used in the secondary synchronization channel of the sub-frame No. 0 and the secondary synchronization channel of the sub-frame No. 5 within one frame, or a different scrambling sequence is used in the secondary synchronization channel of the sub-frame No. 0 and the secondary synchronization channel of the sub-frame No. 5 within one frame. FIG. 8 illustrates the case where the same scrambling sequence is used. That is, in FIG. 8, the first scrambling sequence and the third scrambling sequence are the same, and the second scrambling sequence and the fourth scrambling sequence are the same.

In the first secondary synchronization signal generating method according to the exemplary embodiment of the present invention, the scrambling sequence numbers p and q are one-to-two mapped to a sequence number, which is allocated to the primary synchronization channel. That is, as described above, three primary synchronization channel sequences are defined in the system of current 3G LTE. Therefore, according to the first secondary synchronization signal generating method of the exemplary embodiment of the present invention, two scrambling sequences of the secondary synchronization channel are two-to-one mapped to the primary synchronization signal, as indicated in Equation 3.

$$\text{Sequence number of primary synchronization} \quad \text{(Equation 3)}$$
$$\text{channel: Scrambling sequence numbers } p$$
$$\text{and } q \text{ of secondary synchronization channel}$$
$$0{:}0, \ 1$$
$$1{:}2, \ 3$$
$$2{:}4, \ 5$$

When the scrambling sequence is given with a cyclic shifted sequence of one m-sequence, p and q correspond to a cyclic shift index, respectively.

When the scrambling sequence numbers are one-to-two mapped to the sequence number that is allocated to the primary synchronization channel, the sequence number of the primary synchronization channel is detected at a first cell searching stage of a terminal, thereby being capable of scrambling with the scrambling sequence number of the secondary synchronization channel corresponding to the sequence number of the primary synchronization channel, which is detected at the first cell searching stage.

Figure 9:
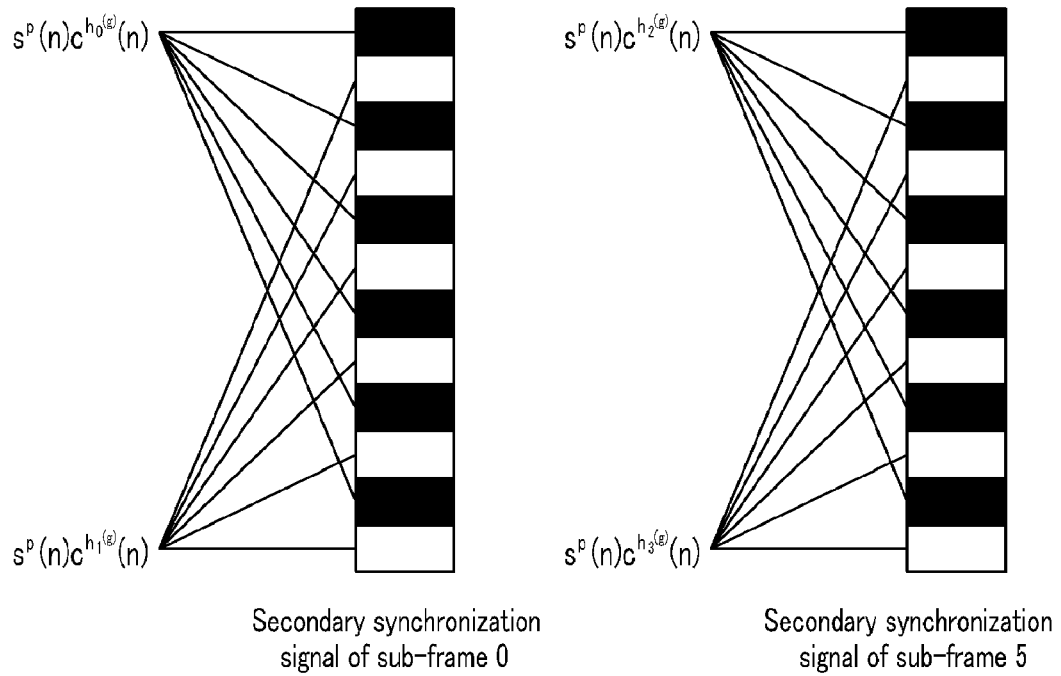
FIG. 9 is a view illustrating the second secondary synchronization signal generating method according to an exemplary embodiment of the present invention.

FIG. 9 is a view illustrating a second secondary synchronization signal generating method according to the exemplary embodiment of the present invention.

According to the second secondary synchronization signal generating method according to the exemplary embodiment of the present invention, a first sequence and a second sequence are scrambled with the same scrambling sequence, respectively, and the scrambled first and second sequences are alternately allocated to the sub-carrier of the secondary synchronization channel.

The second secondary synchronization signal generating method has the merit that the number of scrambling sequences is reduced by half as compared with the first secondary synchronization signal generating method. In addition, as a scrambling sequence, the Gold sequence, the m-sequence, the cyclic shift sequence of the Gold sequence, or the cyclic shift sequence of the m-sequence can be used. According to the second secondary synchronization signal generation method, as indicated in Equation 4, the scrambling sequence numbers are one-to-one mapped to the sequence number allocated to the primary synchronization channel.

Sequence number of primary synchronization (Equation 4)
    channel: Scrambling sequence numbers $p$
    and $q$ of secondary synchronization channel
    0:0, 0
    1:1, 1
    2:2, 2

Figure 10:
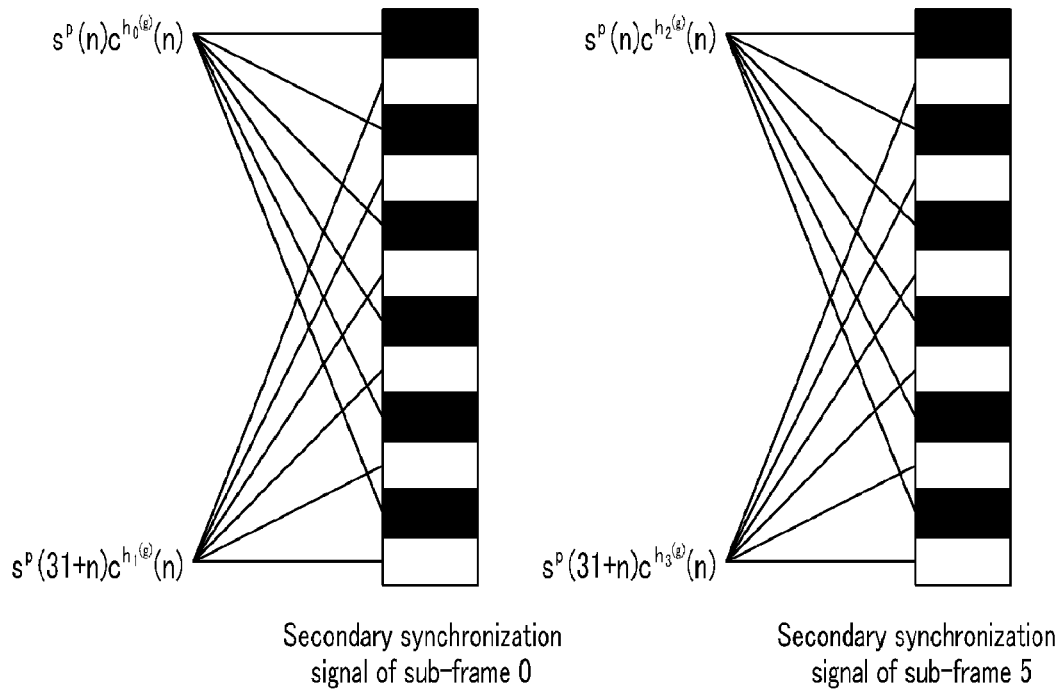
FIG. 10 is a view illustrating the third secondary synchronization signal generating method according to an exemplary embodiment of the present invention.

FIG. 10 is a view illustrating a third secondary synchronization signal generating method according to the exemplary embodiment of the present invention. According to the third secondary synchronization signal generating method of the exemplary embodiment of the present invention, the first sequence and the second sequence are scrambled with one long-scrambling sequence, and the scrambled first and second sequences are alternately allocated to the secondary synchronization channel.

The length of the one long-scrambling sequence used in the third synchronization signal generating method is the sum of the length of the first sequence, the length of the second sequence, and the length of a DC sub-carrier component. That is, the first sequence and the second sequence have a length of 31, respectively, while the scrambling sequence used in the third synchronization signal generating method has a length of 63.

According to the third secondary synchronization signal generating method, a Gold sequence having the length of 63, an m-sequence having the length of 63, a shifted sequence of the Gold sequence having the length of 63, or a shifted sequence of the m-sequence having the length of 63 are used as a scrambling sequence. Furthermore, the scrambling sequence is also mapped to the DC sub-carrier. That is, the third secondary synchronization signal generating method is characterized by the fact that the sequence is not mapped to the DC sub-carrier, but the scrambling sequence is mapped to the DC sub-carrier. However, an element of the scrambling sequence mapped to the DC sub-carrier may not be actually transmitted. According to the third secondary synchronization signal generating method, the scrambling sequence number is one-to-one mapped to the sequence number allocated to the primary synchronization channel.

Figure 11:
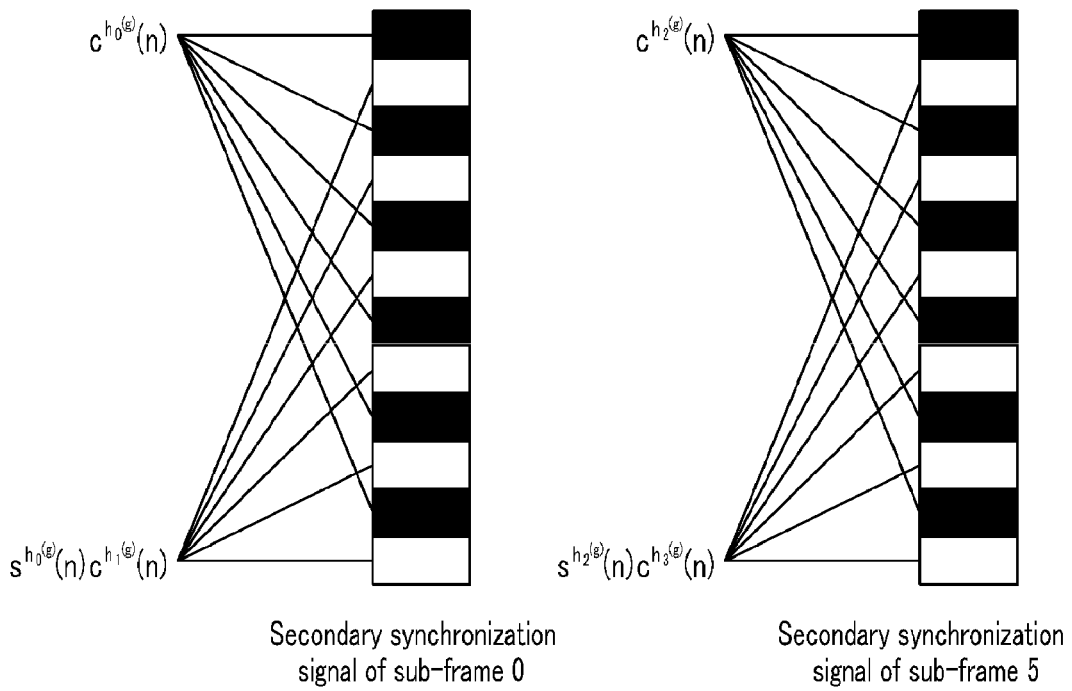
FIG. 11 is a view illustrating the fourth secondary synchronization signal generating method according to an exemplary embodiment of the present invention.

FIG. 11 is a view illustrating a fourth secondary synchronization signal generating method according to the exemplary embodiment of the present invention. According to the fourth secondary synchronization signal generating method, the first sequence is allocated to even-numbered sub-carriers of the secondary synchronization channel, the second sequence is scrambled with the scrambling sequence, and the scrambled second sequence is allocated to odd-numbered sub-carriers of the secondary synchronization channel. That is, the fourth secondary synchronization signal generating method relates to a method of applying the scrambling process to only the second sequence.

The length of the scrambling sequence used in the fourth synchronization signal generating method is the same as that of the second sequence. In addition, the scrambling sequence number, which is the same as the first sequence number, may be used. Furthermore, a Gold sequence, an m-sequence, a cyclic shift sequence of the Gold sequence, or a cyclic shift sequence of the m-sequence can used as a scrambling sequence.

Figure 12:
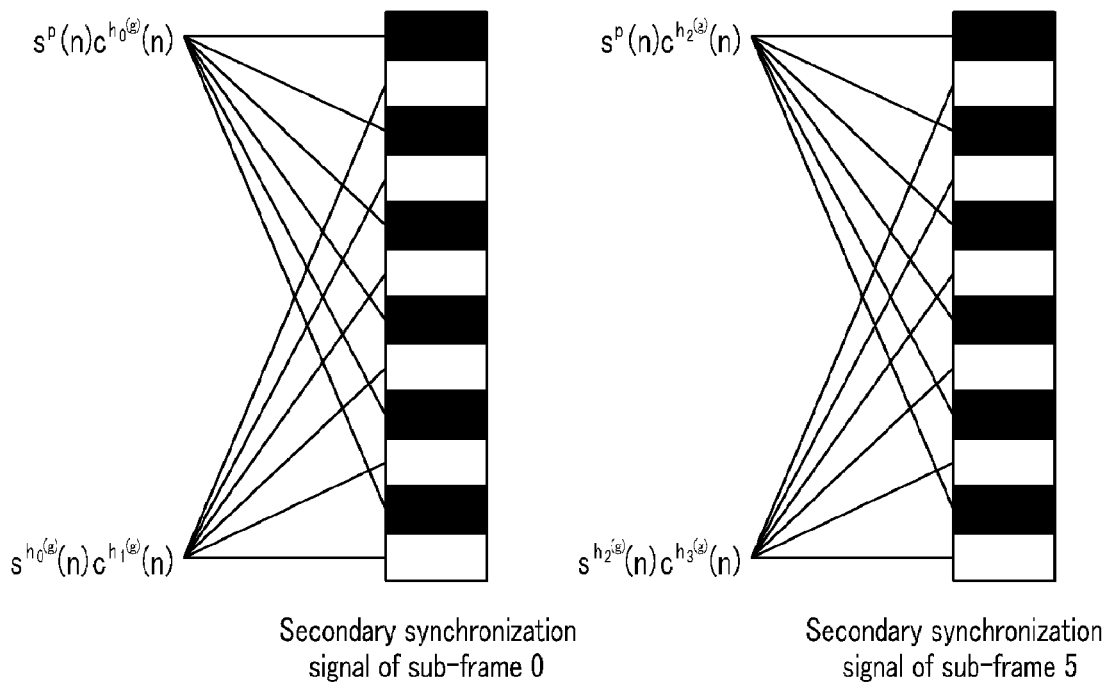
FIG. 12 is a view illustrating the fifth secondary synchronization signal generating method according to an exemplary embodiment of the present invention.

FIG. 12 is a view illustrating a fifth synchronization signal generating method according to the exemplary embodiment of the present invention. According to the fifth secondary synchronization signal generating method, the first sequence is scrambled with the scrambling sequence corresponding to the sequence number allocated to the primary synchronization channel, and the scrambled first sequence is allocated to even-numbered sub-carriers of the secondary synchronization channel. Moreover, the second sequence is scrambled with the scrambling sequence corresponding to the first sequence number, and the scrambled second sequence is allocated to odd-numbered sub-carriers of the secondary synchronization channel.

In the fifth secondary synchronization signal generating method, a Gold sequence, an m-sequence, a cyclic shift sequence of the Gold sequence, or a cyclic shift sequence of the m-sequence can be used as a scrambling sequence. However, the scrambling sequence for scrambling the first sequence and the second sequence should use different polynomials.

The frequency mapper 330 maps transmission data to the time and frequency domains by using the synchronization signal and transmission traffic data generated in the synchronization signal generator 320, thereby generating the frame of downlink signals (S430).

The OFDM transmitter 340 receives the frame of downlink signals and transmits the received downlink frame through the transmission antenna (S440).

Hereinafter, a method of searching cells in the terminal by using the downlink signals generated in accordance with the exemplary embodiment of the present invention will be described with reference to FIG. 13 through FIG. 15.

Figure 13:
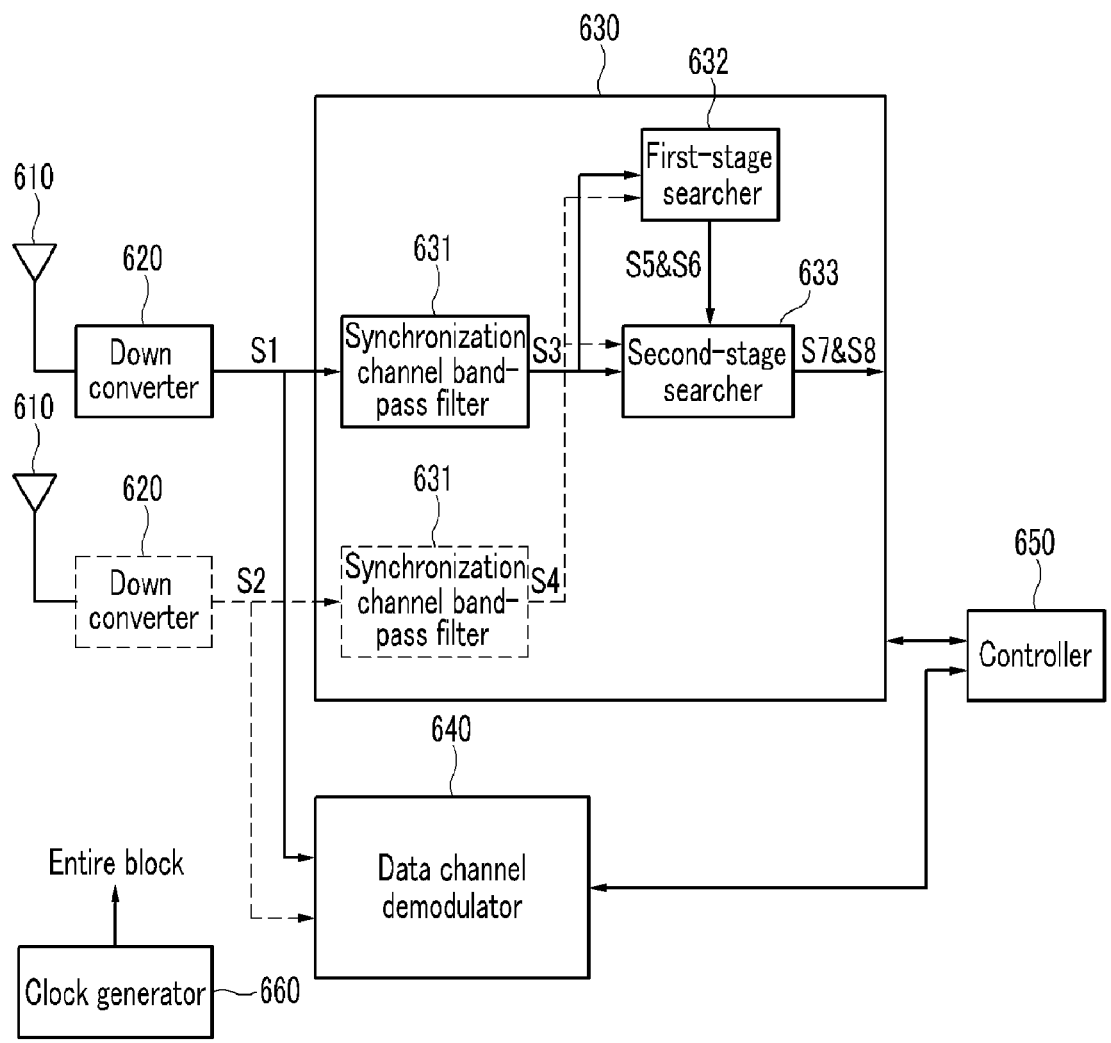
FIG. 13 is a block diagram of a terminal according to an exemplary embodiment of the present invention.
Figure 14:
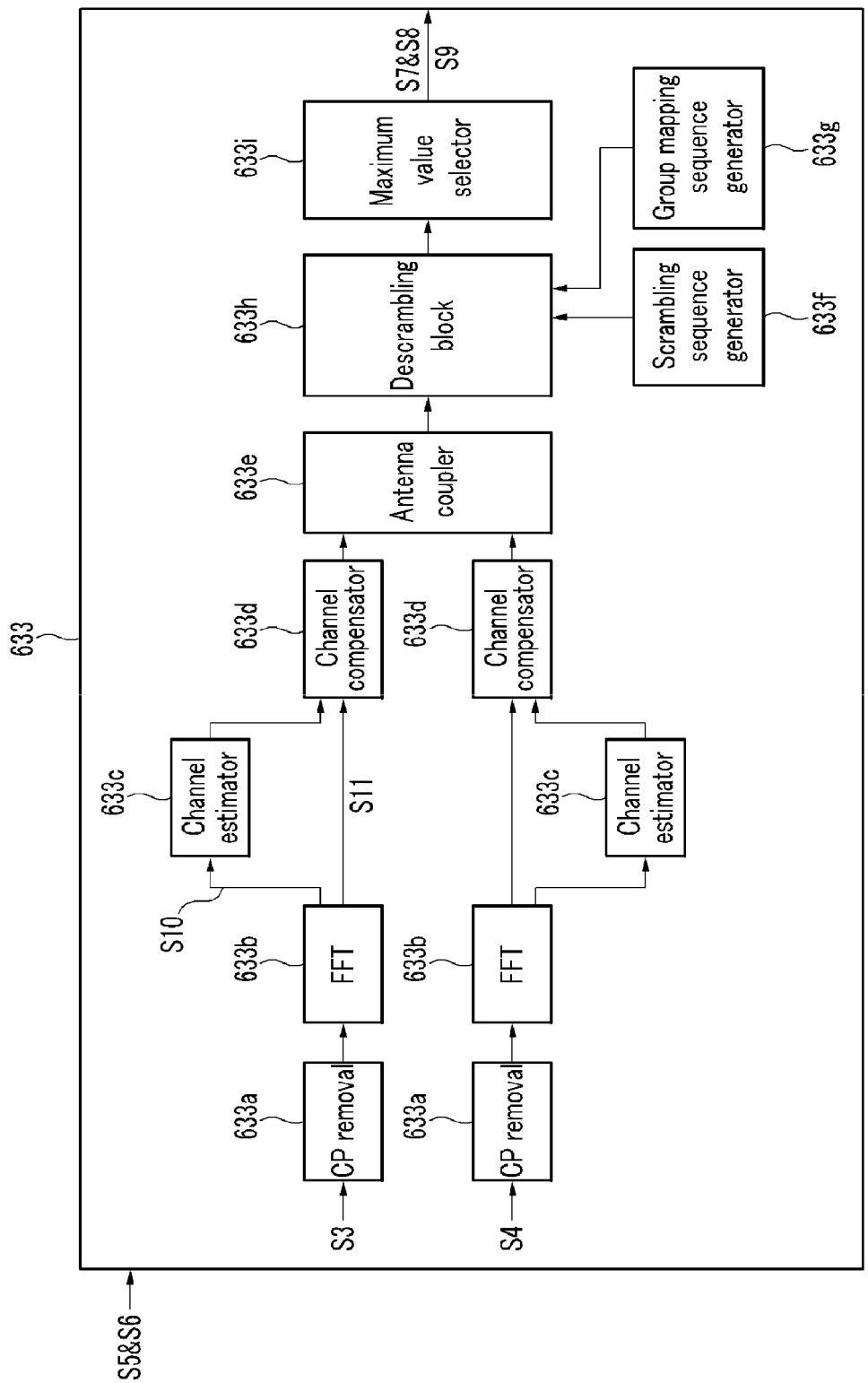
FIG. 14 is a block diagram of a second-stage searcher according to an exemplary embodiment of the present invention.
Figure 15:
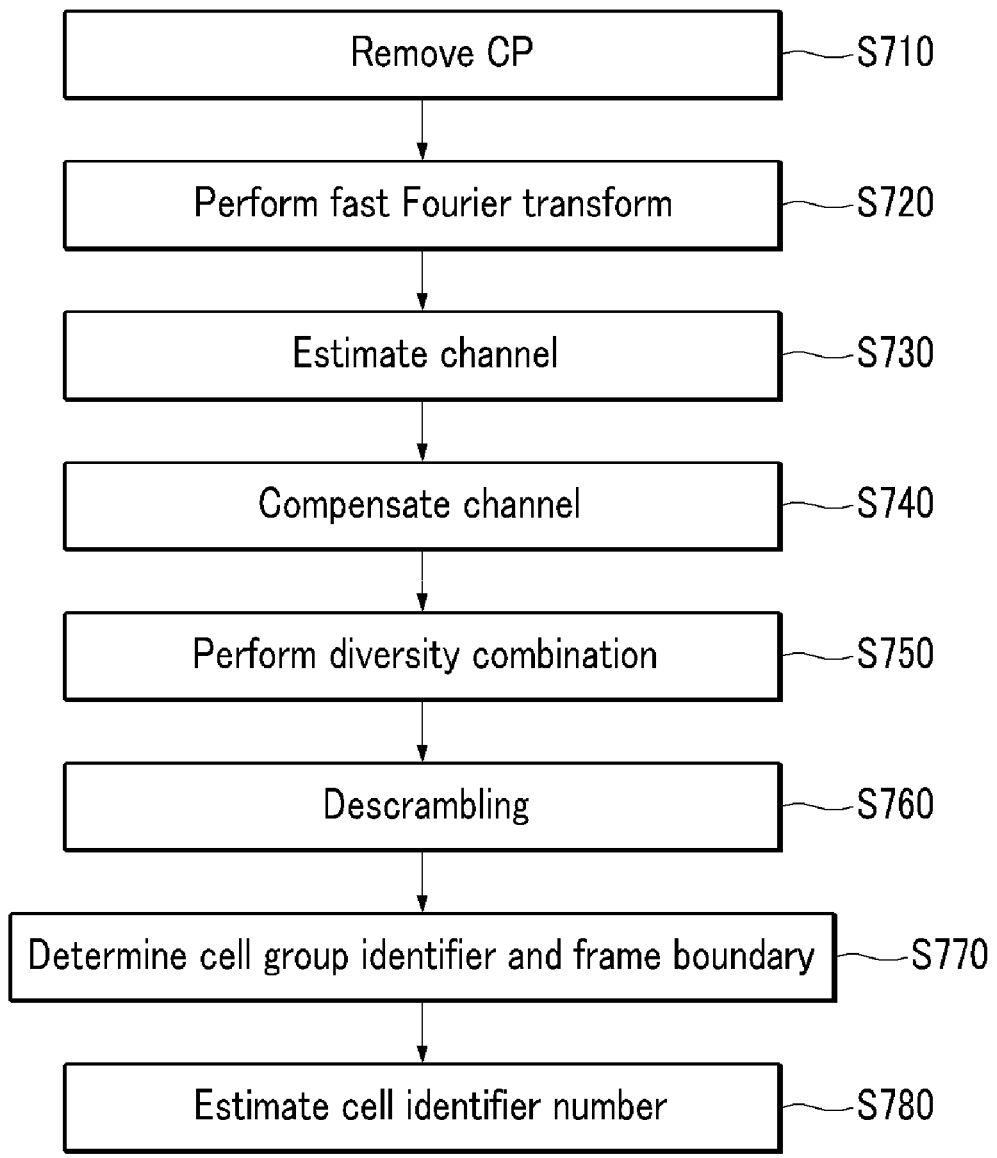
FIG. 15 is a flowchart illustrating a cell searching method according to an exemplary embodiment of the present invention.

FIG. 13 is a block diagram of a terminal according to the exemplary embodiment of the present invention, FIG. 14 is a block diagram of a second-stage searcher according to the exemplary embodiment of the present invention, and FIG. 15 is a flowchart illustrating a cell searching method according to the exemplary embodiment of the present invention.

As shown in FIG. 13, the terminal according to the exemplary embodiment of the present invention includes a receiving antenna 610, a down converter 620, a cell searcher 630, a data channel demodulator 640, a controller 650, and a clock generator 660. In addition, the cell searcher 630 includes a synchronization channel band-pass filter 631, a first-stage cell searcher 632, and a second-stage searcher 633.

The synchronization channel band-pass filter 631 receives received signals S1 and S2 and filters only a synchronization channel in an entire received band. The first-stage searcher 632 receives output signals S3 and S4 of the synchronization channel band-pass filter 631 and acquires 5 msec-timing-information S5 of the downlink signal and sequence number S6 of the primary synchronization channel. Furthermore, the second-stage searcher 633 acquires a cell group identifier S7 and 10 msec-frame-boundary S8 by using the secondary synchronization channel structure of the present invention based on the information S5 and S6 received from the first-stage searcher 632. Moreover, the second-stage searcher 633 extracts a cell identifier S9 by combining the sequence number S6 of the primary synchronization channel and the cell group identifier S7, and can transfer the extracted cell group identifier S7 to the controller 650.

As shown in FIG. 14, the second-stage searcher 633 includes cyclic prefix (CP) removers 633a, fast Fourier transform transformers (FFTs) 633b, channel estimators 633c, channel compensators 633d, an antenna coupler 633e, a scrambling sequence generator 633f, a sequence generator 633g, a descrambling block 633h, and a maximum value selector 633i.

As shown in FIG. 15, the CP removers 633a receive the output signals S3 and S4 of the synchronization channel band-pass filter 631 and remove the CP from the position of the primary synchronization channel symbol and the secondary synchronization channel symbol based on the 5 msec-timing-information S5 received from the first-stage searcher 632 (S710).

The fast Fourier transformers 633b perform fast Fourier transform on the output signals of the CP removers 633a and change a time domain signal into a frequency domain signal (S720).

The channel estimators 633c estimate the channel by using a primary synchronization channel component S10 among the outputs of the fast Fourier transformer (FFT) 633b (S730), and the channel compensators 633d compensate channel distortion of a secondary synchronization channel component among the outputs of the fast Fourier transformer (FFT) 633b by using channel values received from the channel estimators 633c (S740).

The antenna coupler 633e performs diversity combination for two receiving antenna signals that are outputs of two channel compensators 633d (S750). The descrambling block 633h descrambles the output of the antenna coupler 633e by using the scrambling sequence generated by the scrambling sequence generator 633f and the sequence generated by the sequence generator 633g (S760).

The maximum value selector 633i selects the maximum value among the outputs of the descrambling block 633h, determines the cell group identifier S7 and the 10 msec-frame-boundary S8 from the maximum index value, and outputs the determined cell group identifier S7 and 10 msec-frame-boundary S8 (S770). Moreover, the maximum value selector 633i can also analogize the cell identifier number S9 by using the sequence number S6 of the primary synchronization channel and the cell group identifier number S7 (S780).

The exemplary embodiment of the present invention is not necessarily implemented by only the above-described apparatus and/or method, but can be implemented by, for example, a program that achieves the function corresponding to the configuration of the exemplary embodiment of the present invention and a recording medium in which the program is recorded. This can be easily implemented from the above-described exemplary embodiment of the present invention by those skilled in the related art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for generating a frame in a cellular system, the method comprising:
    generating a first sequence and a second sequence for identifying cell groups;
    generating a first scrambling sequence and a second scrambling sequence that are mapped to a sequence number of a primary synchronization signal;
    scrambling the first sequence with the first scrambling sequence and scrambling the second sequence with the second scrambling sequence; and
    mapping the scrambled first sequence and the scrambled second sequence to a frequency domain.

2. The method of claim 1, wherein mapping scrambled first sequence and the scrambled second sequence includes alternately disposing the scrambled first sequence and the scrambled second sequence on a plurality of sub-carriers of the frequency domain.

3. The method of claim 1, wherein scrambling the first sequence includes multiplying each element of the first sequence by each element of the first scrambling sequence corresponding to each element of the first sequence, and
    scrambling the second sequence includes multiplying each element of the second sequence by each element of the second scrambling sequence corresponding to each element of the second sequence.

4. The method of claim 1, wherein the first sequence and the second sequence are cyclic shifted sequences of an m-sequence, respectively.

5. The method of claim 1, wherein the first scrambling sequence is an m-sequence that has different primitive polynomial from the first sequence or a cyclic shifted sequence of the m-sequence.

6. An apparatus for generating a frame, comprising:
    a sequence generator that generates a first sequence and a second sequence for identifying cell groups and generates a first scrambling sequence and a second scrambling sequence that are mapped to a sequence number of a primary synchronization signal; and
    a synchronization signal generator that scrambles the first sequence with the first scrambling sequence, scrambles the second sequence with the second scrambling sequence, and maps the scrambled first sequence and the scrambled second sequence to a frequency domain.

7. The apparatus of claim 6, wherein the synchronization signal generator maps the scrambled first sequence and the scrambled second sequence to the frequency domain by alternately disposing the scrambled first sequence and the scrambled second sequence on a plurality of sub-carriers of the frequency domain.

8. The apparatus of claim 6, wherein each element of the first sequence is multiplied by each element of the first scrambling sequence corresponding to each element of the first sequence, and
    each element of the second sequence is multiplied by each element of the second scrambling sequence corresponding to each element of the second sequence.

9. The apparatus of claim 6, wherein the first sequence and the second sequence are a cyclic shift sequence of an m-sequence, respectively.

10. The apparatus of claim 6, wherein the first scrambling sequence is an m-sequence that has different primitive polynomial from the first sequence or a cyclic shifted sequence of the m-sequence.

11. A method for searching a cell in a terminal, comprising:
receiving a downlink frame including a primary synchronization signal and a secondary synchronization signal; and
determining a cell group to which a terminal belongs, by using the secondary synchronization signal,
wherein in the secondary synchronization signal, a first sequence scrambled with a first scrambling sequence and a second sequence scrambled with a second scrambling sequence are mapped to a frequency domain, and
the first scrambling sequence and the second scrambling sequence are mapped to a sequence number of the primary synchronization signal.

12. The method of claim 11, wherein the scrambled first sequence and the scrambled second sequence are alternately disposed on a plurality of sub-carriers of the frequency domain.

13. The method of claim 11, further comprising
identifying a cell to which the terminal belonged, by using the primary synchronization signal.

14. The method of claim 11, wherein the first sequence and the second sequence are a cyclic shifted sequence of an m-sequence, respectively.

15. The method of claim 11, wherein the first scrambling sequence is an m-sequence that has different primitive polynomial from the first sequence or a cyclic shifted sequence of the m-sequence.

16. An apparatus for searching a cell, comprising:
a receiving antenna that receives a downlink frame including a primary synchronization signal and a secondary synchronization signal; and
a cell searcher that identifies a cell group to which the terminal belongs, from the secondary synchronization signal,
wherein in the secondary synchronization signal, a first sequence scrambled with a first scrambling sequence and a second sequence scrambled with a second scrambling sequence are mapped to a frequency domain, and
the first scrambling sequence and the second scrambling sequence are mapped to a sequence number of the primary synchronization signal.

17. The apparatus of claim 16, wherein the scrambled first sequence and the scrambled second sequence are alternately disposed on a plurality of sub-carriers of the frequency domain.

18. The apparatus of claim 16, wherein the cell searcher identifies a cell to which the terminal belonged, by using the primary synchronization signal.

19. The apparatus of claim 16, wherein the first sequence and the second sequence are a cyclic shift sequence of an m-sequence, respectively.

20. The apparatus of claim 16, wherein the first scrambling sequence is an m-sequence that has different primitive polynomial from the first sequence or a cyclic shifted sequence of the m-sequence.

* * * * *